United States Patent
Kim et al.

(10) Patent No.: US 8,824,379 B2
(45) Date of Patent: Sep. 2, 2014

(54) SYSTEM AND METHOD FOR TRASMITTING/RECEVING A SIGNAL IN A COMMUNICATION SYSTEM

(75) Inventors: Jong-In Kim, Suwon-si (KR); Jin-Ghoo Choi, Seoul (KR); Seung-Hee Han, Hwaseong-si (KR); Chi-Hyun Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 829 days.

(21) Appl. No.: 12/380,960

(22) Filed: Mar. 5, 2009

(65) Prior Publication Data

US 2009/0225694 A1  Sep. 10, 2009

(30) Foreign Application Priority Data

Mar. 5, 2008  (KR) .................. 10-2008-0020741

(51) Int. Cl.
*H04W 4/00* (2009.01)
*H04B 7/14* (2006.01)
*H04B 7/185* (2006.01)

(52) U.S. Cl.
USPC .................... 370/329; 370/315; 455/13.1

(58) Field of Classification Search
USPC .................................................. 370/329
See application file for complete search history.

(56) References Cited

U.S. PATENT DOCUMENTS

| | | | | |
|---|---|---|---|---|
| 7,873,002 B2* | 1/2011 | Cai | | 370/329 |
| 7,995,524 B2* | 8/2011 | Lin | | 370/329 |
| 8,099,042 B2* | 1/2012 | Wang et al. | | 455/13.1 |
| 2006/0046643 A1* | 3/2006 | Izumikawa et al. | | 455/7 |
| 2007/0072604 A1* | 3/2007 | Wang | | 455/428 |
| 2007/0160014 A1* | 7/2007 | Larsson | | 370/338 |
| 2008/0031197 A1* | 2/2008 | Wang et al. | | 370/331 |
| 2008/0062904 A1* | 3/2008 | Tzu-Ming | | 370/312 |
| 2008/0070582 A1* | 3/2008 | Cai | | 455/450 |
| 2008/0085677 A1* | 4/2008 | Sheen et al. | | 455/7 |
| 2008/0107063 A1* | 5/2008 | Oleszczuk | | 370/315 |
| 2008/0108355 A1* | 5/2008 | Oleszcsuk | | 455/442 |
| 2008/0165881 A1* | 7/2008 | Tao et al. | | 375/267 |
| 2008/0220790 A1* | 9/2008 | Cai et al. | | 455/450 |
| 2008/0225789 A1* | 9/2008 | Kim et al. | | 370/329 |
| 2008/0259840 A1* | 10/2008 | Yin et al. | | 370/315 |
| 2008/0285500 A1* | 11/2008 | Zhang et al. | | 370/315 |
| 2009/0010198 A1* | 1/2009 | Boariu et al. | | 370/315 |
| 2009/0059850 A1* | 3/2009 | Jung et al. | | 370/329 |
| 2009/0073915 A1* | 3/2009 | Zhang et al. | | 370/315 |
| 2009/0219854 A1* | 9/2009 | Okuda | | 370/315 |
| 2010/0008284 A1* | 1/2010 | Chae et al. | | 370/315 |
| 2010/0046413 A1* | 2/2010 | Jin et al. | | 370/315 |
| 2010/0054172 A1* | 3/2010 | Boariu et al. | | 370/315 |
| 2011/0243062 A1* | 10/2011 | Wang et al. | | 370/315 |

* cited by examiner

*Primary Examiner* — Guang Li (57) ABSTRACT

Disclosed is a system and method for transmitting/receiving a signal in a communication system. In the system and method, a base station transmits data to a first relay station, which is connected directly thereto from among relay stations belonging to a first relay station group, through a first frame interval, and transmits data to a second relay station, which is connected directly thereto from among relay stations belonging to a second relay station group, through a second frame interval subsequent to the first frame interval. In the first frame interval or the second frame interval where no data is received from the base station, each of the first and second relay stations transmits data to a next relay station connected directly thereto within the same relay station group, and communicates data with a mobile station in direct communication therewith.

24 Claims, 8 Drawing Sheets

SYSTEM AND METHOD FOR TRASMITTING/RECEVING A SIGNAL IN A COMMUNICATION SYSTEM

CROSS-REFERENCE TO RELATED APPLICATION(S) AND CLAIM OF PRIORITY

The present application claims priority to applications entitled "System and Method for Transmitting/Receiving a Signal in a Communication System" filed in the Korean Industrial Property Office on Mar. 5, 2008 and assigned Serial No. 10-2008-0020741, the contents of which are hereby incorporated by reference.

TECHNICAL FIELD OF THE INVENTION

The present invention relates to a communication system, and more particularly to a system and method for a base station to transmit/receive a signal to/from a multi-hop relay station in a communication system including the multi-hop relay station.

BACKGROUND OF THE INVENTION

The next generation communication system, also known as the 4th generation (4G) communication systems, is a system for providing high-capacity data not only at high speed, but also with various Qualities of Service (QoS).

In particular, one of very important requirements in the 4G communication system is to implement a self-configurable wireless network. Herein, the self-configurable wireless network refers to a wireless network that can be configured not only in an autonomous manner, but also a distributive manner without the control of a central control system to provide mobile communication services.

In order to implement the self-configurable wireless communication network required in the 4G communication system, a multi-hop relay scheme may be applied. The multi-hop relay scheme refers to a scheme for transmitting data in a multi-hop manner by using Relay Stations (RS). When the multi-hop relay scheme is applied to the 4G communication system, it is possible to configure a wireless network capable of actively coping with changes in wireless environments, and to more efficiently operate the wireless network.

However, since a communication system employing the multi-hop relay scheme generally uses a frame that includes a Transmit/receive Transition Gap (TTG) and a Receive/transmit Transition Gap (RTG) and includes both a preamble for an RS and a preamble for a Mobile Station (MS), there is a problem in that time-frequency resources have reduced efficiency.

Herein, the TTG/RTG refers to a time gap for distinguishing between an interval during which data is transmitted from a Base Station (BS) to an RS and an interval during which data is transmitted from the RS to an MS. Also, the preamble for an RS refers to a signal for synchronization between a BS and an RS or between an RS and an RS, and the preamble for an MS refers to a signal for synchronization between a BS and an MS or between an RS and an MS.

In addition, there is another problem in that since the location of the preamble for an RS is fixed, the ratio between a frame section corresponding to a backhaul link and a frame section corresponding to an access link cannot be adaptively changed, and the ratio of the frame section corresponding to the backhaul link within the frame cannot increase above a certain level.

Herein, the backhaul link refers to a link between an RS and a BS or between an RS and an RS within the frame, and the access link refers to a link between an RS and an MS or between a BS and an MS.

Therefore, there is an urgent need for a frame structure that makes it possible to efficiently use time-frequency resources, instead of the conventional frame structure in which it is impossible to efficiently use time-frequency resources.

SUMMARY OF THE INVENTION

To address the above-discussed deficiencies of the prior art, it is a primary object to provide a system and method for transmitting/receiving a signal in a communication system that provides a frame structure for efficient use of time-frequency resources.

Also, the present invention provides a system and method for transmitting/receiving a signal in a communication system that provides a frame structure for data transmission/reception by use of a plurality of RSs.

Further, the present invention provides a system and method for transmitting/receiving a signal in a communication system that provides a frame structure for data transmission/reception by use of two continuous frames.

In accordance with an aspect of the present invention, there is provided a method of transmitting/receiving a signal in a communication system, the method including the steps of transmitting data from a BS to a first RS that is connected directly to the BS from among RSs belonging to a first RS group, through a first frame interval, and transmitting data from the BS to a second RS that is connected directly to the BS from among RSs belonging to a second RS group, through a second frame interval subsequent to the first frame interval; and in the first or second frame interval, where no data is received from the BS, transmitting data from each of the first and second RSs to a next RS connected directly thereto within the same RS group, and communicating data between each of the first and second RSs and a MS in direct communication therewith.

In accordance with another aspect of the present invention, there is provided a system for transmitting/receiving a signal in a communication system, the system including a BS for transmitting data to a first RS, which is connected directly thereto from among RSs belonging to a first RS group, through a first frame interval, and transmitting data to a second RS that is connected directly thereto from among RSs belonging to a second RS group, through a second frame interval subsequent to the first frame interval; and the first and second RSs, each of which, in the first frame interval or the second frame interval where no data is received from the BS, transmits data to a next RS connected directly thereto within the same RS group, and communicates data with a MS in direct communication therewith.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 4D, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communications network.

In a system and method proposed in the present invention, a BS transmits data to a first RS that is connected first to the BS, from among RSs belonging to a first relay group, through a first frame interval. Also, the BS transmits data to a second RS that is connected first to the BS, from among RSs belonging to a second RS group, through a second frame interval subsequent to the first frame interval. In the first or second frame interval, where no data is received from the BS, each of the first and second RSs transmits data to a next RS connected directly thereto within the same RS group, and exchanges data with an MS in direct communication therewith.

Figure 1:
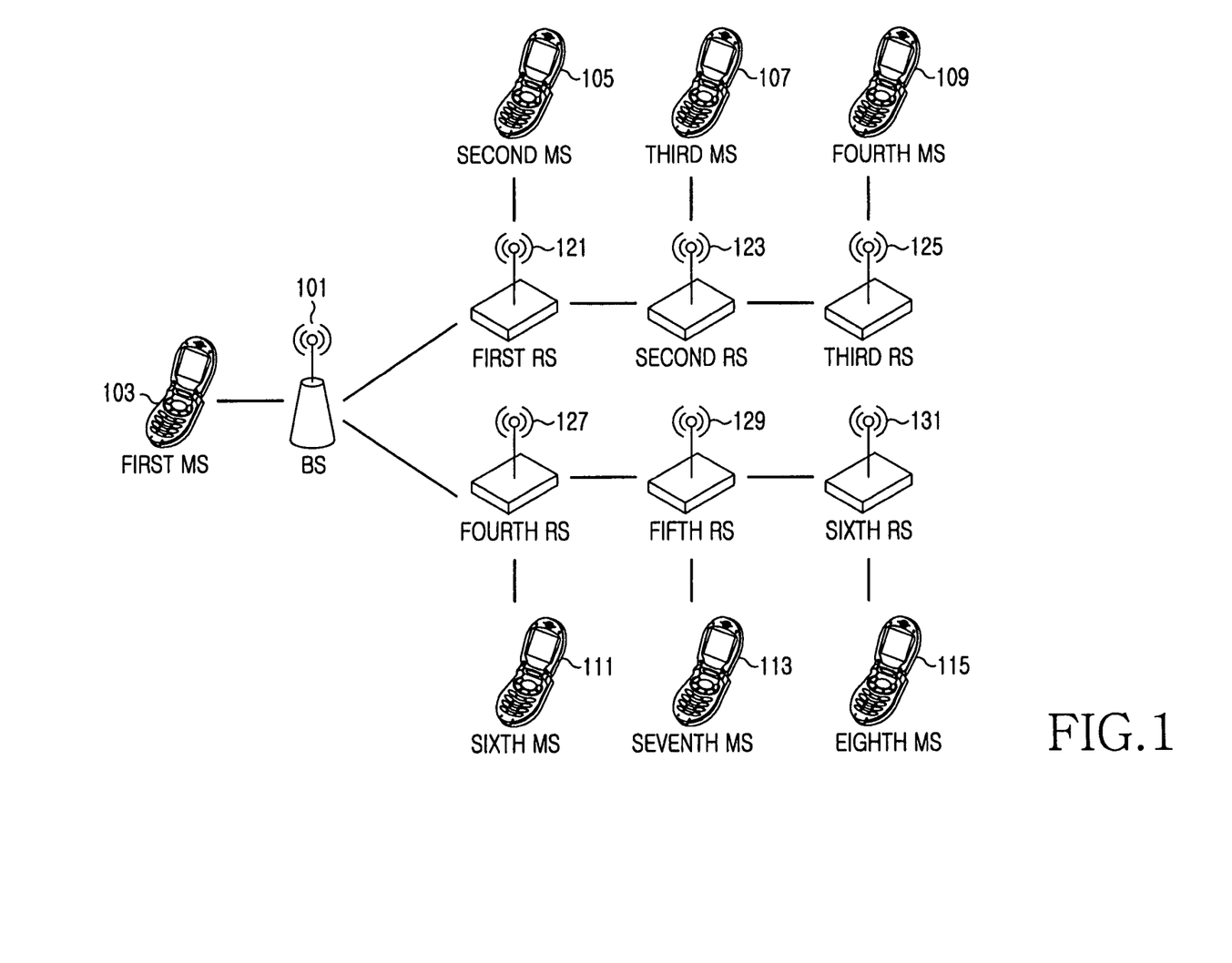
FIG. 1 is a view illustrating a structure of a conventional communication system employing a multi-hop relay scheme.

FIG. 1 illustrates a structure of a conventional communication system employing a multi-hop relay scheme. Although the communication system is assumed to include only three hops for the brevity of description, the number of hops is not limited thereto, and may be at least one.

In FIG. 1, the communication system includes a BS 101, a first MS 103 connected to the BS 101, a first RS 121 and a fourth RS 127 connected to the BS 101 respectively, a second MS 105 and a second RS 123 connected to the first RS 121 respectively, a third MS 107 and a third RS 125 connected to the second RS 123 respectively, a fourth MS 109 connected to the third RS 125, a sixth MS 111 and a fifth RS 129 connected to the fourth RS 127 respectively, a seventh MS 113 and a sixth RS 131 connected to the fifth RS 129 respectively, and an eighth MS 115 connected to the sixth RS 131.

A detailed description will now be given of the elements constituting the communication system. The BS 101 performs scheduling for data, which is to be transmitted to the first MS 103 to the eighth MS 115, to generate a frame, and transmits the generated frame to the first MS 103, the first RS 121, and the fourth RS 127. Also, the first MS 103 receives the frame from the BS 101, and receives data that is allocated to the first MS 103 within the received frame. Herein, the frame includes a DL frame and an UL frame, and the structure of the frame will be described in detail below with reference to FIGS. 2A and 2B.

The first RS 121 receives the frame from the BS 101, receives data that is allocated to the first RS 121 within the received frame, generates a frame including the received data and transmits the generated frame to the second MS 105 and the second RS 123 respectively. The second MS 105 receives the frame from the first RS 121 and receives data that is allocated to the second MS 105 within the received frame. The second RS 123 receives the frame from the first RS 121 and receives data that is allocated to the second RS 123 within the received frame. In this way, the BS 101 transmits corresponding data to the second MS 105 to the eighth MS 115 via the first RS 121 to the sixth RS 131, and each of the second MS 105 to the eighth MS 115 receives data allocated thereto. Also, the second MS 105 to the eighth MS 115 transit data to the BS 101 via the first RS 121 to the sixth RS 131.

Herein, a backhaul link refers to a link between a BS and an RS or between an RS and an RS. Referring to FIG. 1, links between the BS 101 and the first RS 121, between the BS 101 and the fourth RS 127, between the first RS 121 and the second RS 123, between the second RS 123 and the third RS 125, between the fourth RS 127 and the fifth RS 129, and between the fifth RS 129 and the sixth RS 131 correspond to the backhaul link.

Figure 2A:
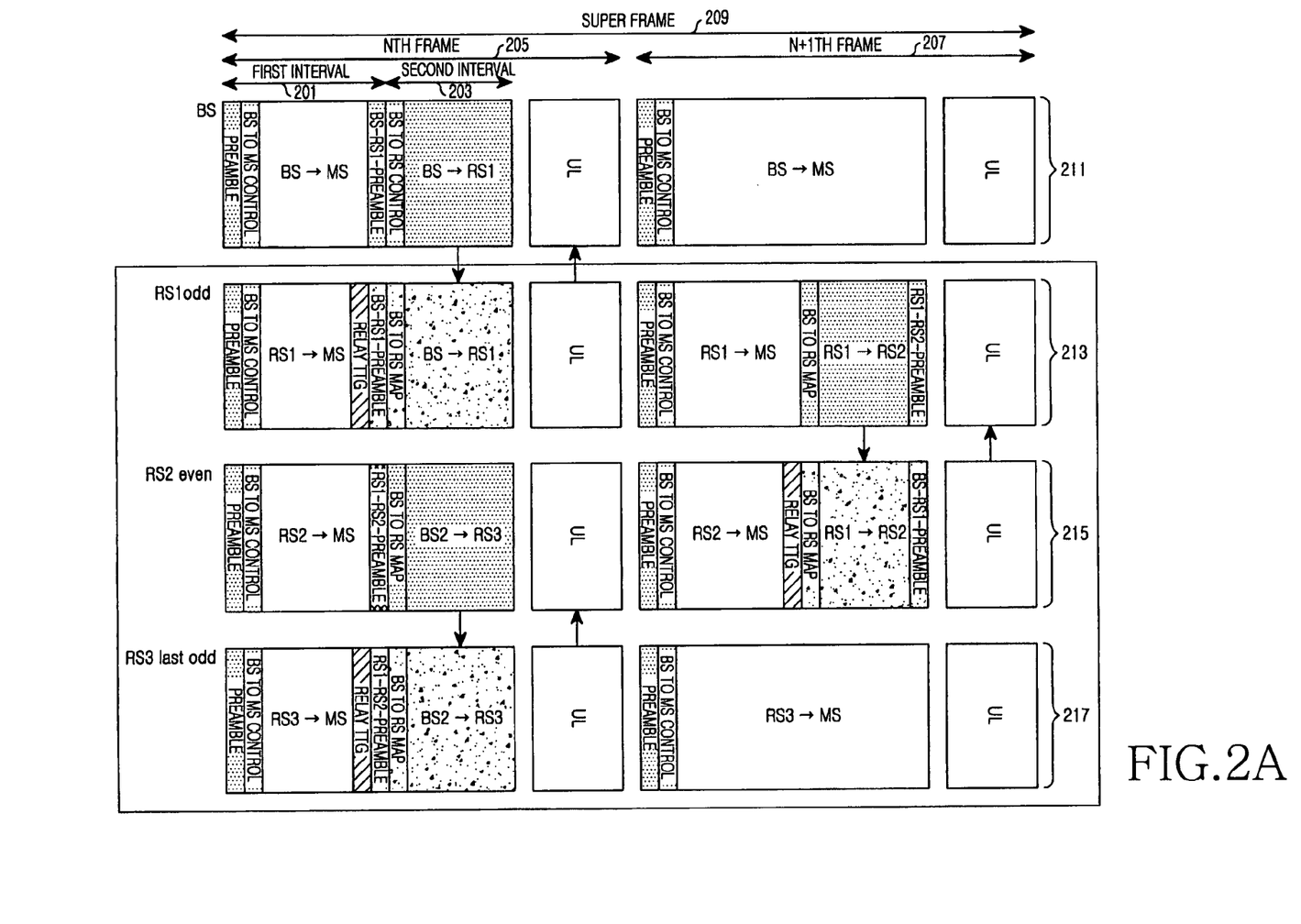
FIG. 2A is a view illustrating a frame structure in accordance with a conventional communication system.
Figure 2B:
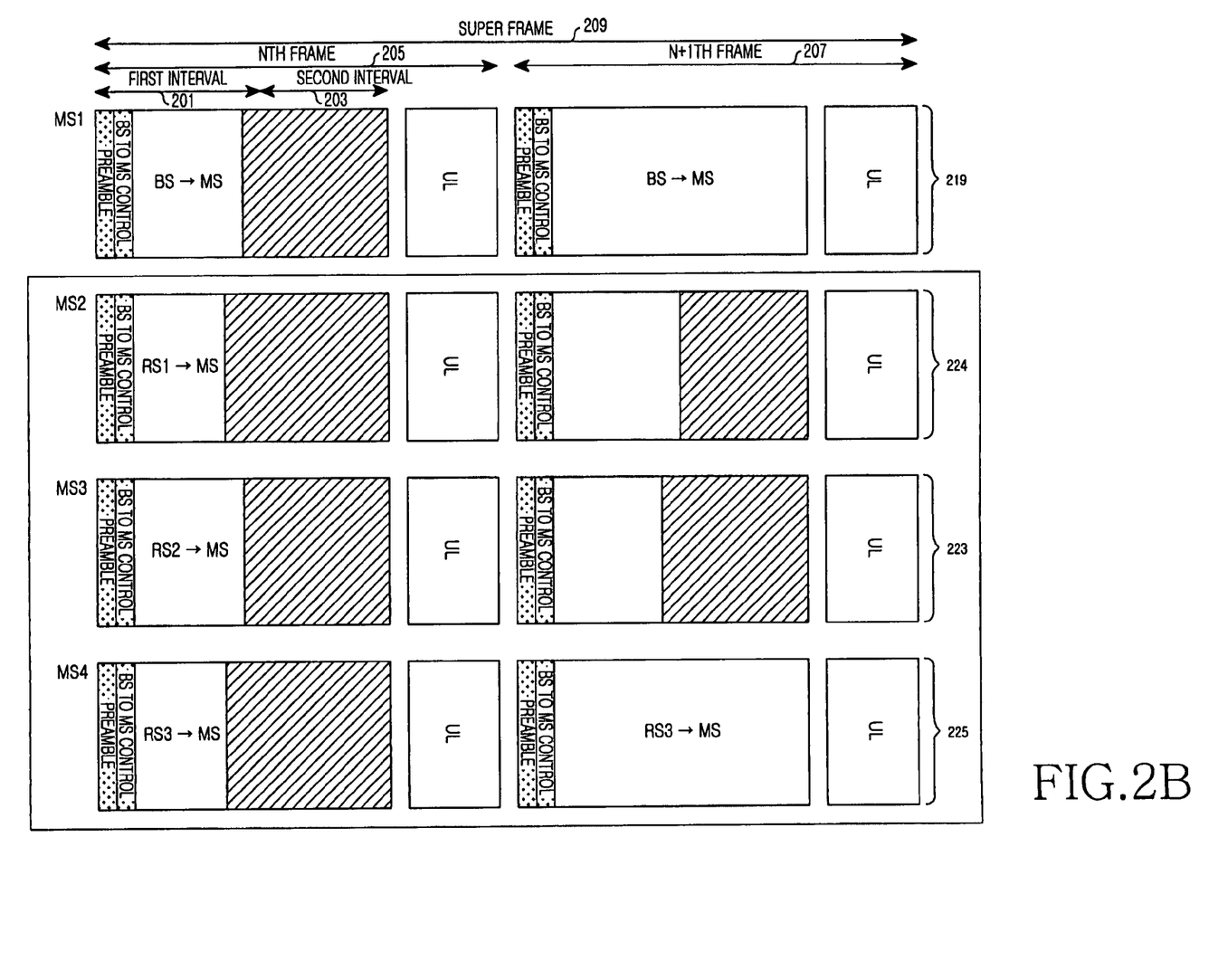
FIG. 2B is another view illustrating a frame structure in accordance with a conventional communication system.

FIGS. 2A and 2B illustrate a frame structure according to the conventional communication system in FIG. 1.

The first RS 121 and the fourth RS 127, each of which is connected firstly to the BS 101, are referred to as "RS-hop 1", the second RS 122 and the fifth RS 129, each of which is connected secondly to the BS 101, are referred to as "RS-hop 2", and the third RS 125 and the sixth RS 131, each of which is connected thirdly to the BS 101, are referred to as "RS-hop 3". Also, the first MS 103 in direct communication with the BS 101 is referred to as "MS-hop 0", MSs communicating with the BS 101 via RS-hop 1 (i.e., the second MS 105 and the sixth MS 111) are referred to as "MS-hop 1", MSs communicating with the BS 101 via RS-hop 2 (i.e., the third MS 107 and the seventh MS 113) are referred to as "MS-hop 2", and MSs communicating with the BS 101 via RS-hop 3 (i.e., the fourth MS 109 and the eighth MS 115) are referred to as "MS-hop 3".

Referring to FIG. 2a, a super frame 209 includes an nth frame 205 and an (n+1)th frame 207, and the nth frame is divided into a first interval 201 and a second interval 203. Also, the nth and (n+1)th frames 211 of the BS 101, the nth and (n+1)th frames 213 of RS-hop 1, the nth and (n+1)th frames 215 of RS-hop 2, and the nth and (n+1)th frames 217 of RS-hop 3 include different data.

More specially, the nth frame of the BS 101 includes a DL frame and an UL frame, and the UL frame includes a data section containing data to be transmitted from RS-hop 1 to the BS 101. Also, the DL frame includes a preamble section containing a preamble for synchronization between the BS 101 and the MSs (the first MS 103 to the eighth MS 115), a control signal section containing a BS to MS control signal to be transmitted from the BS 101 to the MSs (the first MS 103 to the eighth MS 115), a data burst section containing a data burst to be transmitted to MS-hop 0, a preamble section containing a preamble for synchronization between the BS 101 and RS-hop 1, a control signal section containing a BS to RS control signal to be transmitted from the BS 101 to RS-hop 1, and a data burst section containing a data burst to be transmitted to RS-hop 1.

Further, the nth frame of RS-hop 1 includes a DL frame and a UL frame, and the UL frame includes a data section containing data to be transmitted to the BS 101. Also, the DL frame includes a preamble section containing a preamble for synchronization between the BS 101 and the MSs (the first MS 103 to the eighth MS 115), a control signal section containing a BS to MS control signal to be transmitted from the BS 101 to the MSs (the first MS 103 to the eighth MS 115), a data burst section containing a data burst to be transmitted from RS-hop 1 to MS-hop 1, a relay transmit/receive transition gap (relay TTG) for distinguishing between the data burst section and a data burst section containing a data burst to be transmitted from the BS 101 to RS-hop 1, a preamble section containing a preamble for synchronization between the BS 101 and RS-hop 1, an MAP section containing data burst allocation information for the RSs (the first RS 121 to the sixth RS 131), and the data burst section containing a data burst to be transmitted from the BS 101 to RS-hop 1.

Further, the nth frame of RS-hop 2 includes a DL frame and a UL frame, and the UL frame includes a data section containing data to be transmitted from RS-hop 3 to RS-hop 2. Also, the DL frame includes a preamble section containing a preamble for synchronization between the BS 101 and the MSs (the first MS 103 to the eighth MS 115), a control signal section containing a BS to MS control signal to be transmitted from the BS 101 to the MSs (the first MS 103 to the eighth MS 115), a data burst section containing a data burst to be transmitted from RS-hop 2 to MS-hop 2, a preamble section containing a preamble for synchronization between RS-hop 1 and RS-hop 2, an MAP section containing data burst allocation information for the RSs (the first RS 121 to the sixth RS 131), and a data burst section containing a data burst to be transmitted from RS-hop 2 to RS-hop 3.

Further, the nth frame of RS-hop 3 includes a DL frame and a UL frame, and the UL frame includes a data section containing data to be transmitted from RS-hop 3 to RS-hop 2. Also, the DL frame includes a preamble section containing a preamble for synchronization between the BS 101 and the MSs (the first MS 103 to the eighth MS 115), a control signal section containing a BS to MS control signal to be transmitted from the BS 101 to the MSs (the first MS 103 to the eighth MS 115), a data burst section containing a data burst to be transmitted from RS-hop 3 to MS-hop 3, a relay TTG for distinguishing between the data burst section and a data burst section containing a data burst to be transmitted from RS-hop 2 to RS-hop 3, a preamble section containing a preamble for synchronization between RS-hop 1 and RS-hop 2, an MAP section containing data burst allocation information for the RSs (the first RS 121 to the sixth RS 131), and the data burst section containing a data burst to be transmitted from RS-hop 2 to RS-hop 3.

The (n+1)th frame of the BS 101 includes a DL frame and a UL frame, and the UL frame includes a data section containing data to be transmitted from MS-hop 0 to the BS 101. Also, the DL frame includes a preamble section containing a preamble for synchronization between the BS 101 and the MSs (the first MS 103 to the eighth MS 115), a control signal section containing a BS to MS control signal to be transmitted from the BS 101 to the MSs (the first MS 103 to the eighth MS 115), and a data burst section containing a data burst to be transmitted from the BS 101 to MS-hop 0.

Further, the (n+1)th frame of RS-hop 1 includes a DL frame and a UL frame, and the UL frame includes a data section containing data to be transmitted from RS-hop 3 to RS-hop 2. Also, the DL frame includes a preamble section containing a preamble for synchronization between the BS 101 and the MSs (the first MS 103 to the eighth MS 115), a control signal section containing a BS to MS control signal to be transmitted from the BS 101 to the MSs (the first MS 103 to the eighth MS 115), a data burst section containing a data burst to be transmitted from RS-hop 1 to MS-hop 1, an MAP section containing data burst allocation information for the RSs (the first RS 121 to the sixth RS 131), a data burst section containing a data burst to be transmitted from RS-hop 1 to RS-hop 2, and a preamble section containing a preamble for synchronization between RS-hop 1 and RS-hop 2.

Further, the (n+1)th frame of RS-hop 2 includes a DL frame and a UL frame, and the UL frame includes a data section containing data to be transmitted from RS-hop 3 to RS-hop 2. Also, the DL frame includes a preamble section containing a preamble for synchronization between the BS 101 and the MSs (the first MS 103 to the eighth MS 115), a control signal section containing a BS to MS control signal to be transmitted from the BS 101 to the MSs (the first MS 103 to the eighth MS 115), a data burst section containing a data burst to be transmitted from RS-hop 2 to MS-hop 2, a relay TTG for distinguishing between the data burst section and a data burst section containing a data burst to be transmitted from RS-hop 1 to RS-hop 2, an MAP section containing data burst allocation information for the RSs (the first RS 121 to the sixth RS 131), the data burst section containing a data burst to be transmitted from RS-hop 1 to RS-hop 2, and a preamble section containing a preamble for synchronization between RS-hop 1 and RS-hop 2.

Further, the (n+1)th frame of RS-hop 3 includes a DL frame and a UL frame, and the UL frame includes a data section containing data to be transmitted from MS-hop 3 to RS-hop 3. Also, the DL frame includes a preamble section containing a preamble for synchronization between the BS 101 and the MSs (the first MS 103 to the eighth MS 115), a control signal section containing a BS to MS control signal to be transmitted from the BS 101 to the MSs (the first MS 103 to the eighth MS 115), and a data burst section containing a data burst to be transmitted from RS-hop 3 to MS-hop 3.

Herein above, the frame structures of the BS 101 and the RSs (the first RS 121 to the sixth RS 131) in the conventional communication system have been described with reference to FIG. 2A. Reference will now be made to the frame structures of the MSs (the first MS 103 to the eighth MS 115) in the conventional communication system, with reference to FIG. 2b.

Referring to FIG. 2b, the nth and (n+1)th frames 219 of MS-hop 0, the nth and (n+1)th frames 221 of MS-hop 1, the nth and (n+1)th frames 223 of MS-hop 2, and the nth and (n+1)th frames 225 of MS-hop 3 include different data.

More specifically, the nth frame of MS-hop 0 includes a DL frame and a UL frame, and the UL frame includes a data section containing data to be transmitted from MS-hop 0 to the BS 101. Also, the DL frame includes a preamble section containing a preamble for synchronization between the BS 101 and the MSs (the first MS 103 to the eighth MS 115), a control signal section containing a BS to MS control signal to be transmitted from the BS 101 to the MSs (the first MS 103 to the eighth MS 115), a data burst section containing a data burst to be transmitted from the BS 101 to MS-hop 0, and a section where no data is transmitted/received from the BS 101.

Further, the nth frame of MS-hop 1 includes a DL frame and a UL frame, and the UL frame includes a data section containing data to be transmitted from MS-hop 1 to RS-hop 1. Also, the DL frame includes a preamble section containing a preamble for synchronization between the BS 101 and the MSs (the first MS 103 to the eighth MS 115), a control signal section containing a BS to MS control signal to be transmitted from the BS 101 to the MSs (the first MS 103 to the eighth MS 115), a data burst section containing a data burst to be transmitted from RS-hop 1 to MS-hop 1, and a section where no data is transmitted/received from RS-hop 1.

Further, the nth frame of MS-hop 2 includes a DL frame and a UL frame, and the UL frame includes a data section containing data to be transmitted from MS-hop 2 to RS-hop 2. Also, the DL frame includes a preamble section containing a preamble for synchronization between the BS 101 and the MSs (the first MS 103 to the eighth MS 115), a control signal section containing a BS to MS control signal to be transmitted from the BS 101 to the MSs (the first MS 103 to the eighth MS 115), a data burst section containing a data burst to be transmitted from RS-hop 2 to MS-hop 2, and a section where no data is transmitted/received from RS-hop 2.

Further, the nth frame of MS-hop 3 includes a DL frame and a UL frame, and the UL frame includes a data section containing data to be transmitted from MS-hop 3 to RS-hop 3. Also, the DL frame includes a preamble section containing a preamble for synchronization between the BS 101 and the MSs (the first MS 103 to the eighth MS 115), a control signal section containing a BS to MS control signal to be transmitted from the BS 101 to the MSs (the first MS 103 to the eighth MS 115), a data burst section containing a data burst to be transmitted from RS-hop 3 to MS-hop 3, and a section where no data is transmitted/received from RS-hop 3.

The (n+1)th frame of MS-hop 0 includes a DL frame and a UL frame, and the UL frame includes a data section containing data to be transmitted from MS-hop 0 to the BS 101. Also, the DL frame includes a preamble section containing a preamble for synchronization between the BS 101 and the MSs (the first MS 103 to the eighth MS 115), a control signal section containing a BS to MS control signal to be transmitted from the BS 101 to the MSs (the first MS 103 to the eighth MS 115), and a data burst section containing a data burst to be transmitted from the BS 101 to MS-hop 0.

Further, the (n+1)th frame of MS-hop 1 includes a DL frame and a UL frame, and the UL frame includes a data section containing data to be transmitted from MS-hop 1 to RS-hop 1. Also, the DL frame includes a preamble section containing a preamble for synchronization between the BS 101 and the MSs (the first MS 103 to the eighth MS 115), a control signal section containing a BS to MS control signal to be transmitted from the BS 101 to the MSs (the first MS 103 to the eighth MS 115), and a section where no data is transmitted/received from RS-hop 1.

Further, the (n+1)th frame of MS-hop 2 includes a DL frame and a UL frame, and the UL frame includes a data section containing data to be transmitted from MS-hop 2 to RS-hop 2. Also, the DL frame includes a preamble section containing a preamble for synchronization between the BS 101 and the MSs (the first MS 103 to the eighth MS 115), a control signal section containing a BS to MS control signal to be transmitted from the BS 101 to the MSs (the first MS 103 to the eighth MS 115), and a section where no data is transmitted/received from RS-hop 2.

Further, the (n+1)th frame of MS-hop 3 includes a DL frame and a UL frame, and the UL frame includes a data section containing data to be transmitted from MS-hop 3 to RS-hop 3. Also, the DL frame includes a preamble section containing a preamble for synchronization between the BS 101 and the MSs (the first MS 103 to the eighth MS 115), a control signal section containing a BS to MS control signal to be transmitted from the BS 101 to the MSs (the first MS 103 to the eighth MS 115), and a section where no data is transmitted/received from RS-hop 3.

As illustrated in FIGS. 2A and 2B, the nth frame of RS-hop 1, the (n+1)th frame of RS-hop 2, and the nth frame of RS-hop 3 each include a relay TTG. Also, the nth and (n+1)th frames of RS-hop 1, the nth and (n+1)th frame of RS-hop 2, and the nth frame of RS-hop 3 each include a preamble section containing an RS preamble for synchronization between the BS 101 and the RSs (the first RS 121 to the sixth RS 131), and the location the preamble section is fixed.

Such a relay TTG and such a preamble section reduce the efficiency of time-frequency resources. Also, since the location of the preamble is fixed, the ratio between a frame section corresponding to a backhaul link and a frame section corresponding to an access link within the frame cannot be adaptively changed, and the ratio of the frame section corresponding to the backhaul link cannot increase above a certain level.

Figure 3:
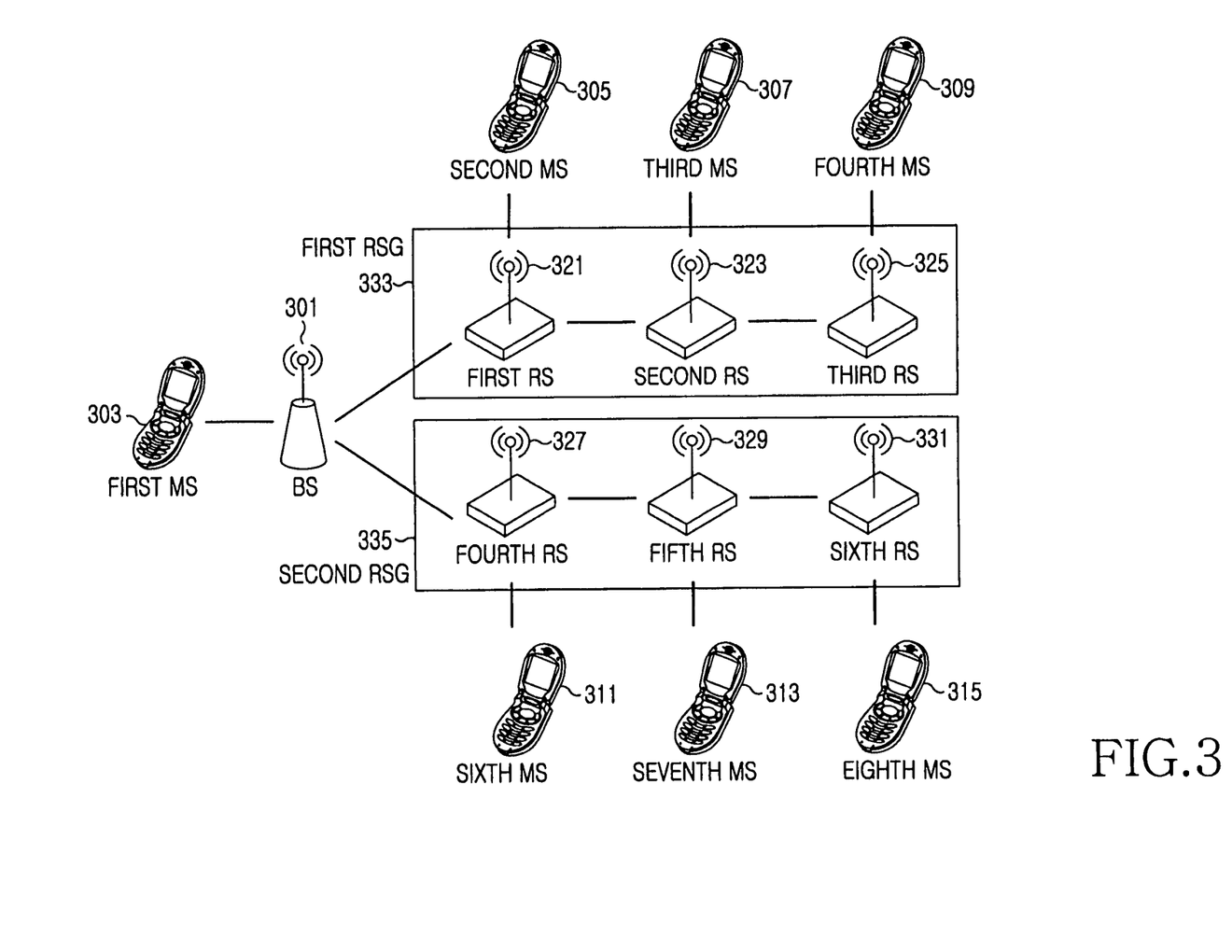
FIG. 3 is a view illustrating a structure of a communication system employing a multi-hop relay scheme in accordance with an exemplary embodiment of the present invention.

FIG. 3 illustrates a structure of a communication system employing a multi-hop relay scheme according to an exemplary embodiment of the present invention.

In FIG. 3, the communication system includes a BS 301, a first MS 303 in communication with the BS 301, a first RS 321 and a fourth RS 327 connected to the BS 301 respectively, a second MS 305 and a second RS 323 connected to the first RS 321 respectively, a third MS 307 and a third RS 325 connected to the second RS 323 respectively, a fourth MS 309 connected to the third RS 325, a sixth MS 311 and a fifth RS 329 connected to the fourth RS 327 respectively, a seventh MS 313 and a sixth RS 331 connected to the fifth RS 329 respectively, and an eighth MS 315 connected to the sixth RS 331.

In the present invention, all the RSs (the first 321 to the sixth RS 331) are grouped into a plurality of groups. Hereinafter, a group to which the first 321 to the third RS 325 belong will be referred to as "relay station group 1 (RSG 1)", and a group to which the remaining RSs (the fourth RS 327 to the sixth RS 331) belong will be referred to as "relay station group 2 (RSG 2)". The BS 101 transmits an nth frame to the first RS 321 from among the RSs belonging to RSG 1, and transmits an (n+1)th frame to the fourth RS 327 from among the RSs belonging to RSG 2.

The first RS 321 generates an (n+1)th frame by using the nth frame received from the BS 301, and transmits the generated (n+1)th frame to the second RS 323 and the second MS 305 respectively. Further, the second RS 323 generates an (n+2)th frame by using the (n+1)th frame received from the first RS 321, and transmits the generated (n+2)th frame to the third RS 325 and the third MS 307 respectively. Further, the third RS 325 generates an (n+3)th frame by using the (n+2)th frame received from the second RS 323, and transmits the generated (n+3)th frame to the fourth MS 309. As a result, RSG 1 can transmit/receive data to/from the RSs (the first RS 321 to the third RS 325) belonging thereto and the MSs (the second MS 305 to the fourth MS 309) in communication with the RSs (the first RS 321 to the third RS 325) by using the nth frame received from the BS 301.

The fourth RS 327 generates an (n+2)th frame by using the (n+1)th frame received from the BS 301, and transmits the generated (n+2)th frame to the fifth RS 329 and the sixth MS 311 respectively. Further, the fifth RS 329 generates an (n+3)th frame by using the (n+2)th frame received from the fourth RS 327, and transmits the generated (n+3)th frame to the sixth RS 331 and the seventh MS 313 respectively. Further, the sixth RS 331 generates an (n+4)th frame by using the (n+3)th frame received from the fifth RS 329, and transmits the generated (n+4)th frame to the eighth MS 331. As a result, RSG 2 can transmit/receive data to/from the RSs (the fourth RS 327 to the sixth RS 331) belonging thereto and the MSs (the sixth MS 311 to the eighth MS 315) in communication with the RSs (the fourth RS 327 to the sixth RS 331) by using the (n+1)th frame received from the BS 301.

That is, the present invention proposes that all RSs (the first RS 321 to the sixth RS 331) be grouped into a plurality of groups, frames of different structures be transmitted the respective plurality of groups, and the frames received by the respective plurality of groups be used for communication between the RSs belonging to the respective plurality of groups and MSs in communication with the RSs. To this end, a new frame structure different from the existing super frame structure is required, and such a new frame structure will be described with reference to FIGS. 4A to 4D.

FIGS. 4A to 4D illustrate a frame structure for use in a communication system according to an exemplary embodiment of the present invention.

Figure 4A:
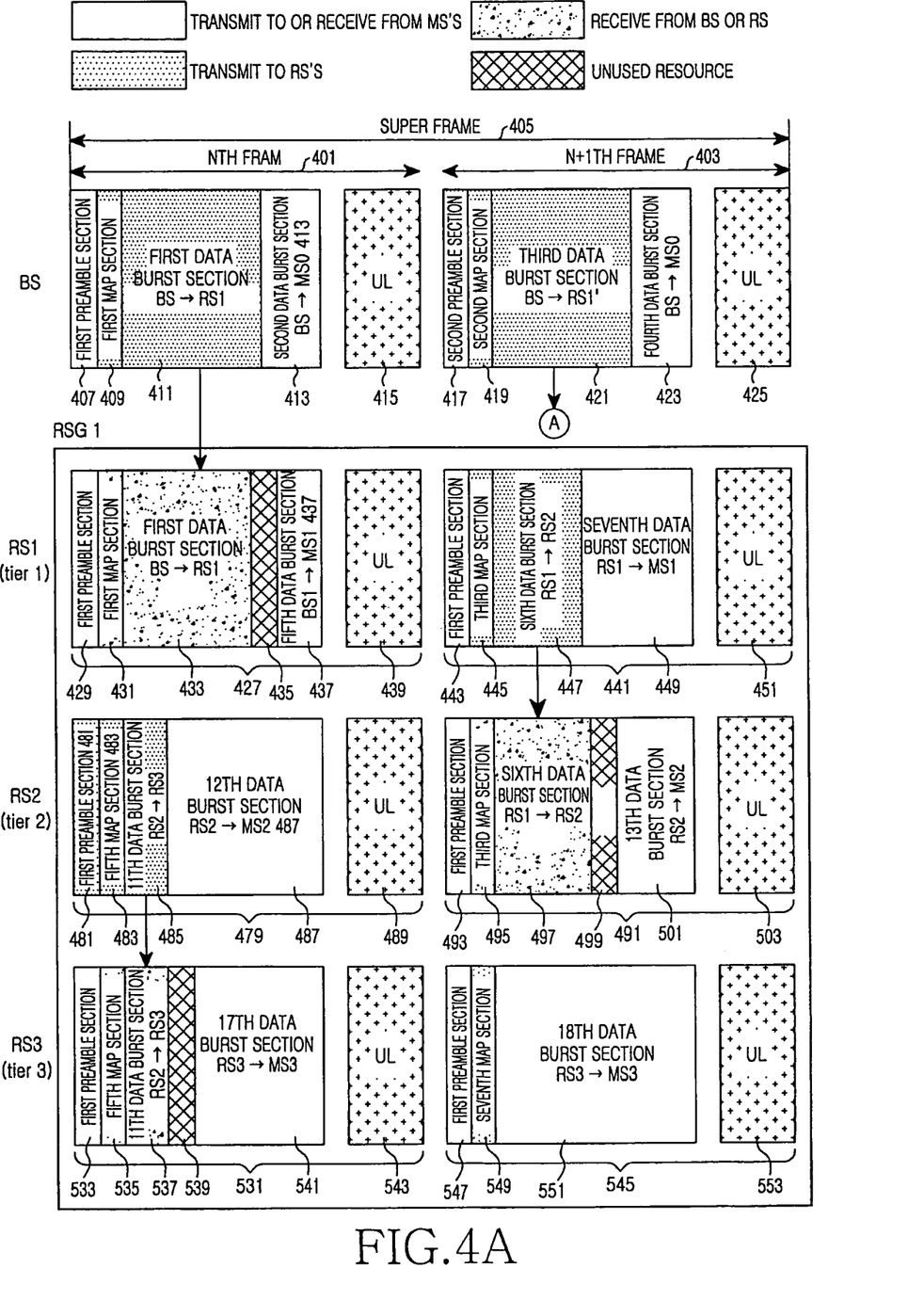
FIG. 4A is a view illustrating a frame structure for use in a communication system in accordance with an exemplary embodiment of the present invention.
Figure 4B:
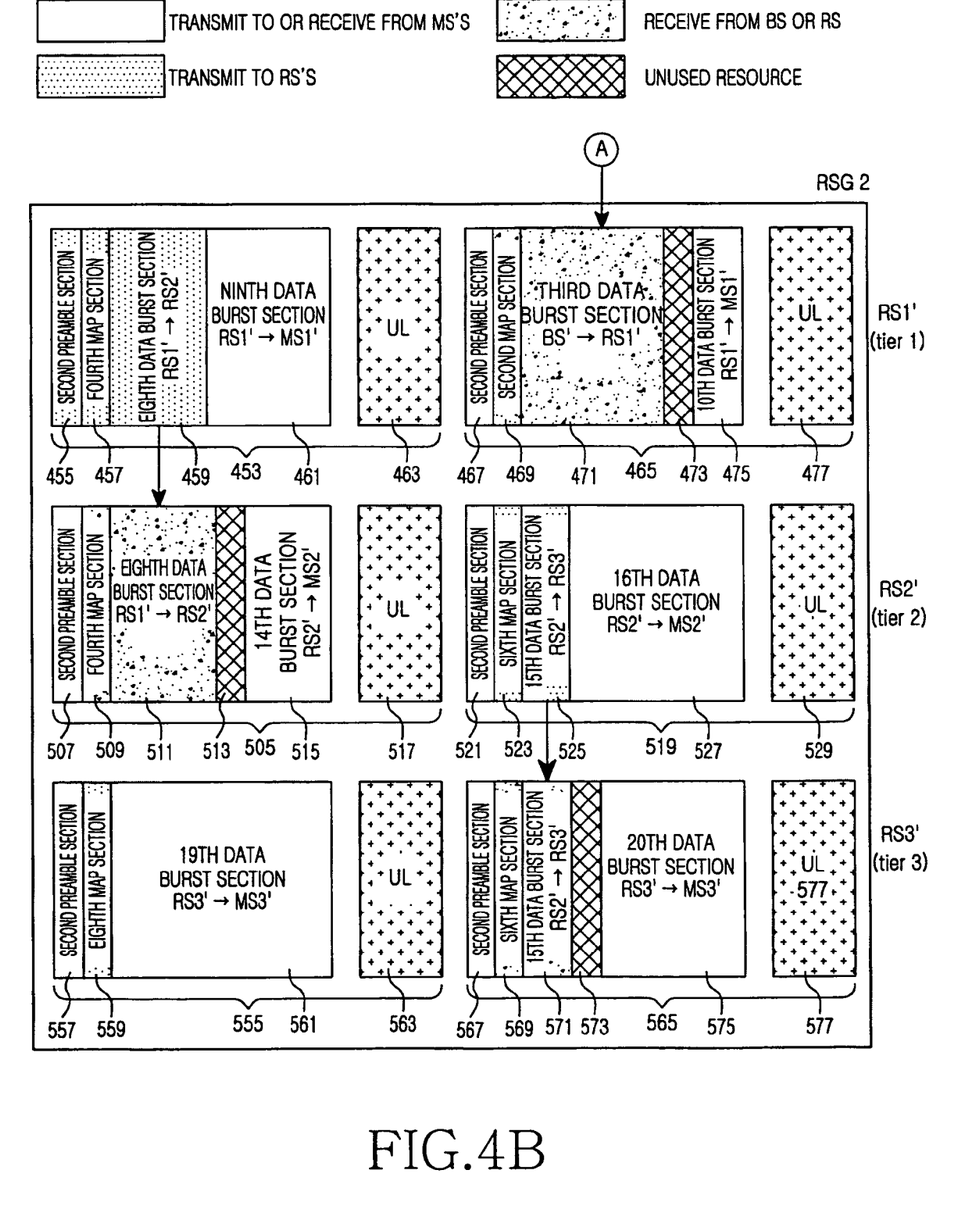
FIG. 4B is another view illustrating a frame structure or use in a communication system in accordance with an exemplary embodiment of the present invention.

Herein, the respective RSs may be classified into RS-hop 1, RS-hop 2, RS-hop 3, RS-hop 1', RS-hop 2', and RS-hop 3', in consideration of the relay station groups to which they belong and the number of hops between them and the BS 301. For example, the first RS 321 that is connected firstly to the BS 301 from among the RSs belonging to RSG 1 may be classified as RS-hop 1, the second RS 323 that is connected secondly to the BS 301 from among the RSs belonging to RSG 1 may be classified as RS-hop 2, the third RS 325 that is connected thirdly to the BS 301 from among the RSs belonging to RSG 1 may be classified as RS-hop 3, the fourth RS 327 that is connected firstly to the BS 301 from among the RSs belonging to RSG 2 may be classified as RS-hop 1', the fifth RS 329 that is connected secondly to the BS 301 from among the RSs belonging to RSG 2 may be classified as RS-hop 2', and the sixth RS 331 that is connected thirdly to the BS 301 from among the RSs belonging to RSG 2 may be classified as RS-hop 3'.

Figure 4C:
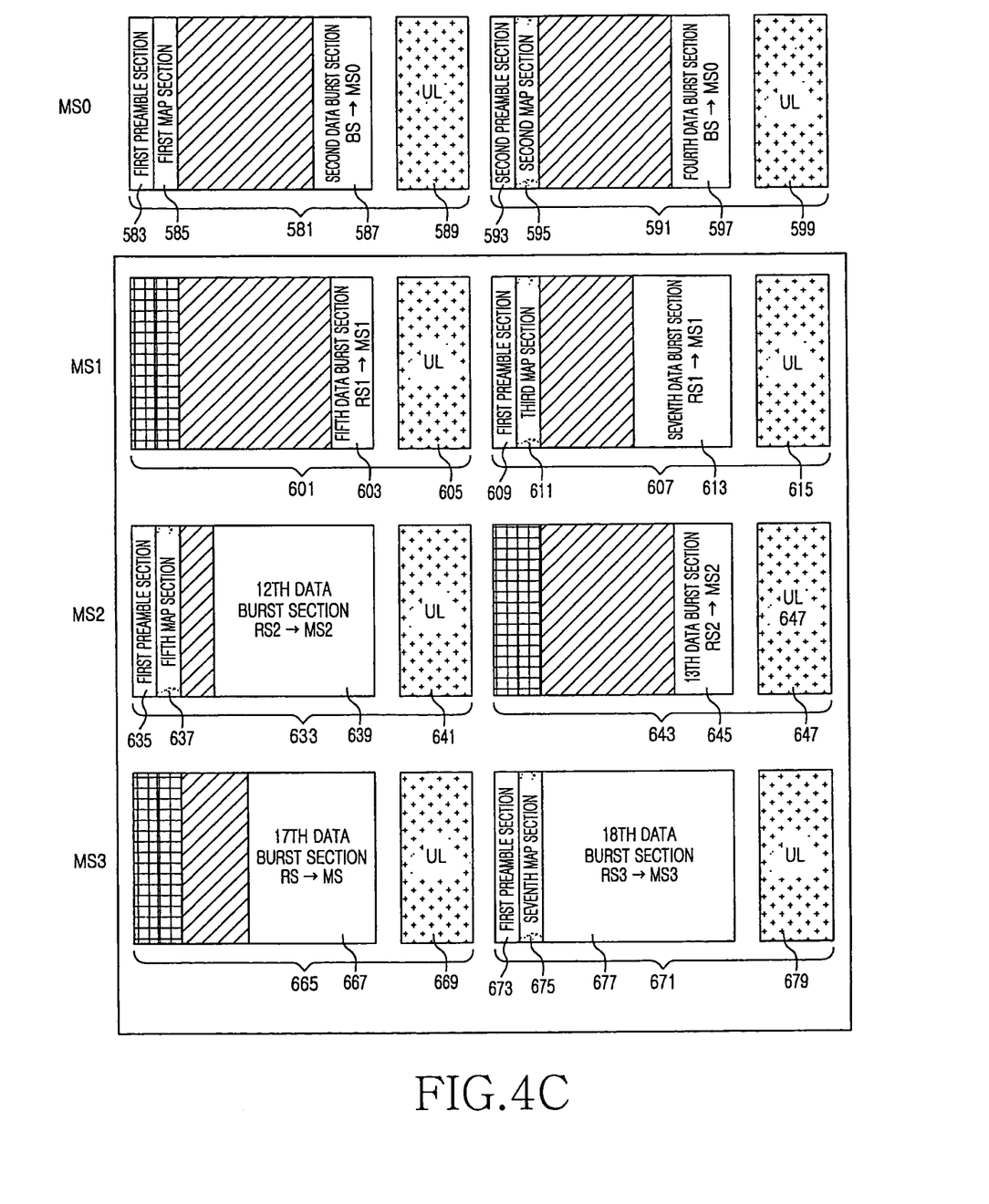
FIG. 4C is another view illustrating a frame structure for use in a communication system in accordance with an exemplary embodiment of the present invention.
Figure 4D:
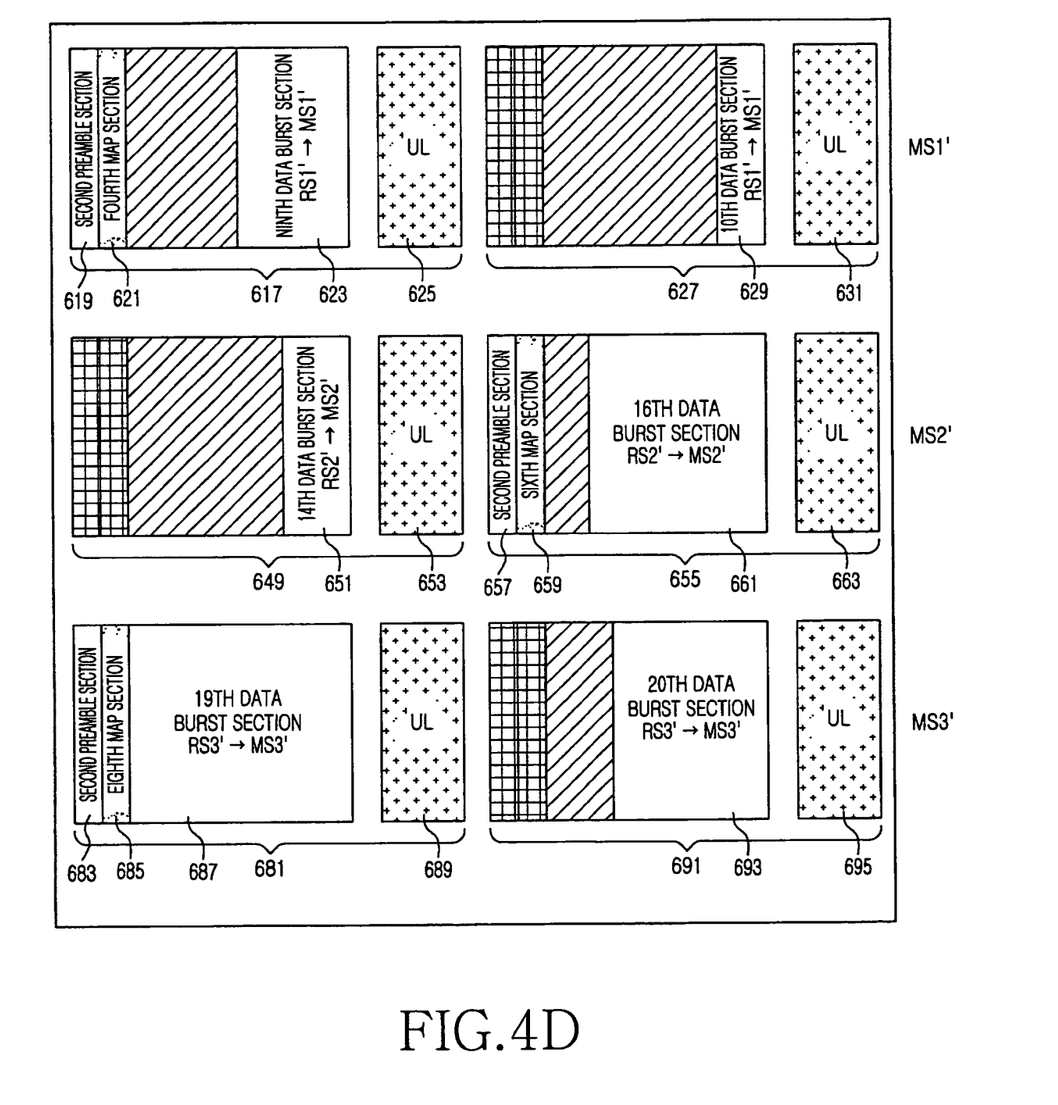
FIG. 4D is another view illustrating a frame structure for use in a communication system in accordance with an exemplary embodiment of the present invention.

Also, the respective MSs may be classified into MS-hop 0, MS-hop 1, MS-hop 2, MS-hop 3, MS-hop 1', MS-hop 2', and MS-hop 3'. For example, the first MS 303 in direct communication with the BS 301 may be classified as MS-hop 0, the second MS 303 in communication with RS-hop 1 may be classified as MS-hop 1, the third MS 305 in communication with RS-hop 2 may be classified as MS-hop 2, the fourth MS 307 in communication with RS-hop 3 may be classified as MS-hop 3, the sixth MS 309 in communication with RS-hop 1' may be classified as MS-hop 1', the seventh MS 311 in communication with RS-hop 2' may be classified as MS-hop 2', and the eighth MS 315 in communication with RS-hop 3' may be classified as MS-hop 3'.

Referring to FIGS. 4A and 4B, a specific super frame 405 includes an nth frame 401 and an (n+1)th frame 403. Also, the nth frame is transmitted through a predetermined nth frame interval, and the (n+1)th frame is transmitted through a predetermined (n+1)th frame interval. Herein, the (n+1)th frame interval is a frame interval subsequent to the nth frame interval.

The BS 301 transmits a first preamble, first MAP information containing data burst allocation information for RS-hop 1 and data burst allocation information for MS-hop 0, a data burst allocated to RS-hop 1, and a data burst allocated to MS-hop 0 to RS-hop 1 and MS-hop 0 respectively; or receives a data burst from MS-hop 0 through the nth frame 401. Also, the BS 301 transmits a second preamble, second MAP information containing data burst allocation information for RS-hop 1' and data burst allocation information for MS-hop 0, a data burst allocated to RS-hop 1', and a data burst allocated to MS-hop 0 to RS-hop 1' and MS-hop 0 respectively; or receives a data burst from MS-hop 0 through the (n+1)th frame 403.

Herein, the first preamble is a preamble for synchronization between the RSs (the first RS 321 to the third RS 325) belonging to RSG 1 and the MSs (the second MS 305 to the fourth RS 309) in communication with the RSs, and the second preamble is a preamble for synchronization between the RSs (the fourth RS 327 to the sixth RS 331) belonging to RSG 2 and the MSs (the sixth MS 311 to the eighth RS 315) in communication with the RSs. That is, the RSs to be synchronized using the first preamble and the RSs to be synchronized using the second preamble belong to different groups.

The nth frame 401 includes a UL frame 415 and a DL frame, and the UL frame 415 includes data to be transmitted from RS-hop 1 to the BS 301. Also, the DL frame includes a first preamble section 407 containing the first preamble, a first MAP section 409 containing the first MAP information, a first data burst section 411 containing a data burst to be transmitted from the BS 301 to RS-hop 1, and a second data burst section 413 containing a data burst to be transmitted from the BS 301 to MS-hop 0 or received from MS-hop 0.

The (n+1)th frame 402 includes a UL frame 425 and a DL frame, and the UL frame 425 includes data to be transmitted from RS-hop 1' to the BS 301. Also, the DL frame includes a second preamble section 417 containing the second preamble, a second MAP section 419 containing the second MAP information, a third data burst section 421 containing a data burst to be transmitted from the BS 301 to RS-hop 1', and a fourth data burst section 423 containing a data burst to be transmitted from the BS 301 to MS-hop 0 or received from MS-hop 0.

The BS 301 continuously generates and transmits super frames 405, each including such nth and (n+1)th frames.

RS-hop 1 receives the first preamble, the first MAP information, and the data burst allocated to RS-hop 1, and transmits the data burst allocated to MS-hop 1 or receives the data burst from MS-hop 1 through the nth frame 427. Also, RS-hop 1 transmits the first preamble, third MAP information containing data burst allocation information for RS-hop 2 and data burst information for MS-hop 1, and a data burst allocated to RS-hop 2, and transmits a data burst allocated to MS-hop 1 or receives a data burst from MS-hop 1 through the (n+1)th frame 441.

More specifically, RS-hop 1 receives the first preamble and the first MAP information through the nth frame 427, acquires synchronization by using the received first preamble, detects information on the location and size of a data burst allocated to RS-hop 1 by using the received first MAP information, and receives the data burst allocated to RS-hop 1, based on the detected information. Further, RS-hop 1 transmits a data burst allocated to MS-hop 1 or receives a data burst from MS-hop 1 after a predetermined TTG elapses. Further, RS-hop 1 divides the received data burst allocated thereto into a data burst allocated to RS-hop 2 and a data burst allocated to MS-hop 1, and generates a third MAP information containing allocation information for the data burst allocated to RS-hop 2 and allocation information for the data burst allocated to MS-hop 1. Further, RS-hop 1 transmits the first preamble, the third MAP information, the data burst allocated to RS-hop 2, and the data burst allocated to MS-hop 1 to RS-hop 2 and MS-hop 1 through the (n+1)th frame 441, and receives a data burst from MS-hop 1.

Herein, the nth frame 427 includes a UL frame 439 and a DL frame, and the UL frame 439 includes data to be transmitted from RS-hop 1 to the BS 301. Also, the DL frame includes a first preamble section 429 containing the first preamble, a first MAP section 431 containing the first MAP information, a first data burst section 433, a TTG 435 for distinguishing between the first data burst section 433 and a fifth data burst section 437, and the fifth data burst section 437 containing the data burst allocated to MS-hop 1 or the data burst received from MS-hop 1.

Further, the (n+1)th frame 441 includes a UL frame 451 and a DL frame, and the UL frame 451 includes data to be transmitted from RS-hop 2 to RS-hop 1. Also, the DL frame includes a first preamble section 443 containing the first preamble, a third MAP section 445 containing the third MAP information, a sixth data burst section 447 containing the data burst allocated to RS-hop 2, and a seventh data burst section 449 containing the data burst allocated to MS-hop 1 or the data burst received from MS-hop 1.

RS-hop 2 transmits the first preamble, fifth MAP information containing data burst allocation information for RS-hop 3 and data burst allocation information for MS-hop 2, and a data burst allocated to RS-hop 3, and transmits a data burst allocated to MS-hop 2 or receives a data burst from MS-hop 2 through the nth frame 479. Also, RS-hop 2 receives the first preamble, the third MAP information, and the data burst allocated to RS-hop 2 from RS-hop 1, and transmits the data burst allocated to MS-hop 2 or receives a data burst from MS-hop 2 through the (n+1)th frame 491.

Herein, the nth frame 479 includes a UL frame 489 and a DL frame, and the UL frame 489 includes data to be transmitted from RS-hop 3 to RS-hop 2. Also, the DL frame includes a first preamble section 481 containing the first preamble, a fifth MAP section 483 containing the fifth MAP information, an eleventh data burst section 485 containing the data burst allocated to RS-hop 3, and a twelfth data burst section 487 containing the data burst allocated to MS-hop 2 or the data burst received from MS-hop 2.

Further, the (n+1)th frame 491 includes a UL frame 503 and a DL frame, and the UL frame 503 includes data to be transmitted from RS-hop 2 to RS-hop 1. Also, the DL frame includes a first preamble section 493 containing the first preamble, a third MAP section 495, a sixth data burst section 497, a TTG 499 for distinguishing between the sixth data burst section 497 and a thirteenth data burst section 501, and the thirteenth data burst section 501 containing the data burst allocated to MS-hop 2 or the data burst received from MS-hop 2.

RS-hop 3 receives the first preamble, the fifth MAP information, and the data burst allocated to RS-hop 3, and transmits a data burst allocated to MS-hop 3 or receives a data burst from MS-hop 3 through the nth frame 531. Also, RS-hop 3 transmits the first preamble, and seventh MAP information containing data burst allocation information for MS-hop 3, and transmits the data burst allocated to MS-hop 3 or receives a data burst from MS-hop 3 through the (n+1)th frame 545.

Herein, the nth frame 531 includes a UL frame 543 and a DL frame, and the UL frame 543 includes data to be transmitted from RS-hop 3 to RS-hop 2. Also, the DL frame includes a first preamble section 533 containing the first preamble, a fifth MAP section 535 containing the fifth MAP information, an eleventh data burst section 537, a TTG 539 for distinguishing between the eleventh data burst section 537 and a seventeenth data burst section 541, and the seventeenth data burst section 541 containing the data burst allocated to MS-hop 3 or the data burst received from MS-hop 3.

Further, the (n+1)th frame 545 includes a UL frame 553 and a DL frame, and the UL frame 553 includes data to be transmitted from a next RS to RS-hop 3. Also, the DL frame includes a first preamble section 547 containing the first preamble, a seventh MAP section 549 containing the seventh MAP information, and an eighteenth data burst section 551 containing the data burst allocated to MS-hop 3 or the data burst transmitted from MS-hop 3.

RS-hop 1' transmits the second preamble, fourth MAP information containing data burst allocation information for RS-hop 2' and data burst allocation information for MS-hop 1', and a data burst allocated to RS-hop 2', and transmits a data burst allocated to MS-hop 1' or receives a data burst from MS-hop 1' through the nth frame 453. Also, RS-hop 1' receives the second preamble, the second MAP information, and the data burst allocated to RS-hop 1', and transmits the data burst allocated to MS-hop. 1' or receives a data burst from MS-hop 1' through the (n+1)th frame 465.

Herein, the nth frame 453 includes a UL frame 463 and a DL frame, and the UL frame 463 includes data to be transmitted from RS-hop 2' to RS-hop 1'. Also, the DL frame includes a second preamble section 455 containing the second preamble, a fourth MAP section 457 containing the fourth MAP information, an eighth data burst section 459 containing the data burst allocated to RS-hop 2', and a ninth data burst section 461 containing the data burst allocated to MS-hop 1' or the data burst received from MS-hop 1'.

Further, the (n+1)th frame 465 includes a UL frame 477 and a DL frame, and the UL frame 477 includes data to be transmitted from RS-hop 1' to the BS 301. Also, the DL frame includes a second preamble section 467 containing the second preamble, a second MAP section 469 containing the second MAP information, a third data burst section 471, a TTG 473 for distinguishing between the second data burst section 471 and a tenth data burst section 475, and the tenth data burst section 475 containing the data burst allocated to MS-hop 1' or the data burst received from MS-hop 1'.

RS-hop 2' receives the second preamble, the fourth MAP information, and the data burst allocated to RS-hop 2', and transmits a data burst allocated to MS-hop 2' or receives a data burst from MS-hop 2' through the nth frame 505. Also, RS-hop 2' transmits the second preamble, sixth MAP information containing data burst allocation information for RS-hop 3' and data burst allocation information for MS-hop 2', and a data burst allocated to RS-hop 3', and transmits the data burst allocated to MS-hop 2' or receives a data burst from MS-hop 2' through the (n+1)th frame 519.

Herein, the nth frame 505 includes a UL frame 517 and a DL frame, and the UL frame 517 includes data to be transmitted from RS-hop 2' to RS-hop 1'. Also, the DL frame includes a second preamble section 507 containing the second preamble, a fourth MAP section 509 containing the fourth MAP information, an eighth data burst section 511, a TTG 513 for distinguishing between the eighth data burst section 511 and a fourteenth data burst section 515, and the fourteenth data burst section 515 containing the data burst allocated to MS-hop 2' or the data burst received from MS-hop 2'.

Further, the (n+1)th frame 519 includes a UL frame 529 and a DL frame, and the UL frame 529 includes data to be transmitted from RS-hop 3' to RS-hop 2'. Also, the DL frame includes a second preamble section 521 containing the second preamble, a sixth MAP section 523 containing the sixth MAP information, a fifteenth data burst section 525 containing the data burst allocated to RS-hop 3', and a sixteenth data burst section 527 containing the data burst allocated to MS-hop 2' or the data burst transmitted from MS-hop 2'.

RS-hop 3' transmits the second preamble, eighth MAP information containing data burst allocation information for MS-hop 3', and a data burst allocated to MS-hop 3' through the nth frame 555. Also, RS-hop 3' receives the second preamble, the sixth MAP information, and the data burst allocated to RS-hop 3', and transmits the data burst allocated to MS-hop 3' or receives a data burst from MS-hop 3' through the (n+1)th frame 565.

Herein, the nth frame 555 includes a UL frame 563 and a DL frame, and the UL frame 563 includes data to be transmitted from a next RS. Also, the DL frame includes a second preamble section 557 containing the second preamble, an eighth MAP section 559 containing the eighth MAP information, and a nineteenth data burst section 561 containing the data burst allocated to MS-hop 3'.

Further, the (n+1)th frame 565 includes a UL frame 577 and a DL frame, and the UL frame 577 includes data to be transmitted from RS-hop 3' to RS-hop 2'. Also, the DL frame includes a second preamble section 567 containing the second preamble, a sixth MAP section 569 containing the sixth MAP information, a fifth data burst section 571, a TTG 573 for distinguishing between the fifth data burst section 571 and a twentieth data burst section 575, and the twentieth data burst section 575 containing the data burst allocated to MS-hop 3' or the data burst received from MS-hop 3'.

As discussed above, in the communication system according to present invention, data is transmitted/received between the BS 301 and RS-hop 1, between RS-hop 2 and RS-hop 3, between RS-hop 1' and RS-hop 2', and between RS-hop 3' and MS-hop 3' through the nth frame. Also, data is transmitted/received between the BS 301 and RS-hop 1', between RS-hop 2' and RS-hop 3', between RS-hop 1 and RS-hop 2, and between RS-hop 3 and MS-hop 3 through the (n+1)th frame. RS-hops 1, 2, and 3 belonging to RSG 1 acquire synchronization by using the first preamble, and RS-hops 1', 2', and 3' belonging to RSG 2 acquire synchronization by using the second preamble.

Referring to FIGS. 4C and 4D, MS-hop 0 receives the first preamble and the first MAP information, and receives the data burst allocated to MS-hop 0 from the BS 301 or transmits a data burst to the BS 301 through the nth frame 581. Also, MS-hop 0 receives the second preamble and the second MAP information, and receives the data burst allocated to MS-hop 0 from the BS 301 or transmits a data burst to the BS 301 through the (n+1)th frame 591. With regard to this, MS-hop 0 receives both the first and second preambles, and can acquire synchronization with the BS 301 by using the received first and second preambles.

Herein, the nth frame 581 includes a UL frame 589 and a DL frame, and the UL frame 589 includes data to be transmitted from RS-hop 1 to the BS 301. Also, the DL frame includes a first preamble section 583 containing the first preamble, a first MAP section 585 containing the first MAP information, and a second data burst section 587 containing the data burst allocated to MS-hop 0 or the data burst to be transmitted from MS-hop 0 to the BS 301.

The (n+1)th frame 591 includes a UL frame 599 and a DL frame, and the UL frame 599 includes data to be transmitted from RS-hop 1' to the BS 301. Also, the DL frame includes a second preamble section 593 containing the second preamble, a second MAP section 595 containing the second MAP information, and a second data burst section 597 containing the data burst allocated to MS-hop 0 or the data burst to be transmitted from MS-hop 0 to the BS 301.

MS-hop 1 receives a data burst from RS-hop 1 or transmits a data burst to RS-hop 1 through the nth frame 601. Also, MS-hop 1 receives the first preamble and the third MAP information from RS-hop 1, and receives a data burst from RS-hop 1 or transmits a data burst to RS-hop 1 through the (n+1)th frame 607. With regard to this, MS-hop 1 can acquire synchronization with RS-hop 1 by using the first preamble received through the (n+1)th frame 607.

Herein, the nth frame 601 includes a UL frame 605 and a DL frame, and the UL frame 605 includes data to be transmitted from RS-hop 1 to the BS 301. Also, the DL frame includes a fifth data burst section 603 containing the data burst allocated to MS-hop 1 or the data burst to be transmitted from MS-hop 1 to RS-hop 1.

The (n+1)th frame 607 includes a UL frame 615 and a DL frame, and the UL frame 615 includes data to be transmitted from RS-hop 2 to RS-hop 1. Also, the DL frame includes a first preamble section 609 containing the first preamble, a third MAP section 611 containing the third MAP information, and a seventh data burst section 613 containing the data burst allocated to MS-hop 1 or the data burst to be transmitted from MS-hop 1 to RS-hop 1.

MS-hop 2 receives the first preamble and the fifth MAP information, and receives a data burst from RS-hop 2 or transmits a data burst to RS-hop 2 through the nth frame 633. Also, MS-hop 2 receives a data burst from RS-hop 2 or transmits a data burst to RS-hop 2 through the (n+1)th frame 643. With regard to this, MS-hop 2 can acquire synchronization with RS-hop 2 by using the first preamble received through the nth frame 633.

Herein, the nth frame 633 includes a UL frame 641 and a DL frame, and the UL frame 641 includes data to be transmitted from RS-hop 3 to RS-hop 2. Also, the DL frame includes a first preamble section 635 containing the first preamble, a fifth MAP section 637 containing the fifth MAP information, and a twelfth data burst section 639 containing the data burst allocated to MS-hop 2 or the data burst to be transmitted from MS-hop 2 to RS-hop 2.

The (n+1)th frame 643 includes a UL frame 647 and a DL frame, and the UL frame 647 includes data to be transmitted from RS-hop 2 to RS-hop 1. Also, the DL frame includes a thirteenth data burst section 645 containing the data burst allocated to MS-hop 2 or the data burst to be transmitted from MS-hop 2 to RS-hop 2.

MS-hop 3 receives a data burst from RS-hop 3 or transmits a data burst to RS-hop 3 through the nth frame 665. Also, MS-hop 3 receives the first preamble and seventh MAP information, and receives a data burst from RS-hop 3 or transmits a data burst to RS-hop 3 through the (n+1)th frame 671. With regard to this, MS-hop 3 can acquire synchronization with RS-hop 3 by using the first preamble received through the (n+1)th frame 671.

Herein, the nth frame 665 includes a UL frame 669 and a DL frame, and the UL frame 669 includes data to be transmitted from RS-hop 3 to RS-hop 2. Also, the DL frame includes a seventeenth data burst section 667 containing the data burst allocated to MS-hop 3 or the data burst to be transmitted from MS-hop 3 to RS-hop 3.

The (n+1)th frame 671 includes a UL frame 679 and a DL frame, and the UL frame 679 includes data to be transmitted from a next RS in direct communication with RS-hop 3 to RS-hop 3. Also, the DL frame includes a first preamble section 673 containing the first preamble, a seventh MAP section 675 containing the seventh MAP information, and an eighteenth data burst section 677 containing the data burst allocated to MS-hop 3 or the data burst to be transmitted from MS-hop 3 to RS-hop 3.

MS-hop 1' receives the second preamble and the fourth MAP information, and receives a data burst from RS-hop 1' or transmits a data burst to RS-hop 1' through the nth frame 617. Also, MS-hop 1' receives a data burst from RS-hop 1' or transmits a data burst to RS-hop 1' through the (n+1)th frame 627. With regard to this, MS-hop 1' can acquire synchronization with RS-hop 1' by using the second preamble received through the nth frame 617.

Herein, the nth frame 617 includes a UL frame 625 and a DL frame, and the UL frame 625 includes data to be transmitted from RS-hop 2' to RS-hop 1'. Also, the DL frame includes a second preamble section 619 containing the second preamble, a fourth MAP section 621 containing the fourth MAP information, and a ninth data burst section 623 containing the data burst allocated to MS-hop 1' or the data burst to be transmitted from MS-hop 1' to RS-hop 1'.

The (n+1)th frame 627 includes a UL frame 631 and a DL frame, and the UL frame 631 includes data to be transmitted from RS-hop 1' to the BS 301. Also, the DL frame includes a tenth data burst section 629 containing the data burst allocated to MS-hop 1' or the data burst to be transmitted from MS-hop 1' to RS-hop 1'.

MS-hop 2' receives a data burst from RS-hop 2' or transmits a data burst to RS-hop 2' through the nth frame 649. Also, MS-hop 2' receives the second preamble and sixth MAP information, and receives a data burst from RS-hop 2' or transmits a data burst to RS-hop 2' through the (n+1)th frame 655. With regard to this, MS-hop 2' can acquire synchronization with RS-hop 2' by using the second preamble received through the (n+1)th frame 655.

Herein, the nth frame 649 includes a UL frame 653 and a DL frame, and the UL frame 653 includes data to be transmitted from RS-hop 2' to RS-hop 1'. Also, the DL frame includes a fourteenth data burst section 651 containing the data burst allocated to MS-hop 2' or the data burst to be transmitted from MS-hop 2' to RS-hop 2'.

The (n+1)th frame 655 includes a UL frame 663 and a DL frame, and the UL frame 663 includes data to be transmitted from RS-hop 3' to RS-hop 2'. Also, the DL frame includes a second preamble section 657 containing the second preamble, a sixth MAP section 659 containing the sixth MAP information, and a sixteenth data burst section 661 containing the data burst allocated to MS-hop 2' or the data burst to be transmitted from MS-hop 2' to RS-hop 2'.

MS-hop 3' receives the second preamble and the eighth MAP information, and receives a data burst from RS-hop 3' or transmits a data burst to RS-hop 3' through the nth frame 681. Also, MS-hop 3' receives a data burst from RS-hop 3' or transmits a data burst to RS-hop 3' through the (n+1)th frame 691. With regard to this, MS-hop 3' can acquire synchronization with RS-hop 3' by using the second preamble received through the nth frame 681.

Herein, the nth frame 681 includes a UL frame 689 and a DL frame, and the UL frame 689 includes data to be transmitted from an RS, which is next to RS-hop 3', to RS-hop 3'. Also, the DL frame includes a second preamble section 683 containing the second preamble, an eighth MAP section 685 containing the eighth MAP information, and a nineteenth data burst section 687 containing the data burst allocated to MS-hop 3' or the data burst to be transmitted from MS-hop 3' to RS-hop 3'.

The (n+1)th frame 691 includes a UL frame 695 and a DL frame, and the UL frame 695 includes data to be transmitted from RS-hop 3' to RS-hop 2'. Also, the DL frame includes a twentieth data burst section 693 containing the data burst allocated to MS-hop 3' or the data burst to be transmitted from MS-hop 3' to RS-hop 3'.

As discussed above, MS-hops 1, 2, 3, 1', 2', and 3' transmits/receives data to/from a corresponding RS through the nth and (n+1)th frames. MS-hops 1, 2 and 3 can acquire synchronization with the corresponding RS by using the first preamble, and MS-hops 1', 2', and 3' can acquire synchronization with the corresponding RS by using the second preamble.

According to the present invention as described above, a signal is transmitted/received using a new frame structure in a communication system employing a multi-hop relay scheme, so that time-frequency resources can be efficiently used.

Although the present disclosure has been described with an exemplary embodiment, various changes and modifications may be suggested to one skilled in the art. It is intended that the present disclosure encompass such changes and modifications as fall within the scope of the appended claims. As an example, although it is assume in the above description that an RSG includes three RSs, the present invention may be applied in a case where an RSG includes a different number of RSs.

What is claimed is:

1. A method of transmitting/receiving a signal in a communication system, the method comprising:
   receiving, by a first Relay Station(RS), data from a Base Station (BS) through a first frame interval, the first RS that is connected directly to the BS from among RSs belonging to a first RS group; and
   receiving, by a second RS, data from the BS through a second frame interval, the second RS that is connected directly to the BS from among RSs belonging to a second RS group,
   wherein a data is transmitted and received between the BS and the first RS belonging to the first RS group, between the second RS and at least one of a fourth RS belonging to the second RS group, and between the second RS and a second Mobile Station (MS) connected directly to the second RS through the first frame interval, and
   wherein a data is transmitted and received between the BS and the second RS belonging to the second RS group, between the first RS and at least one of a third RS belonging to the first RS group, and between the first RS and a first MS connected directly to the first RS through the second frame interval.

2. The method as claimed in claim 1, wherein, in the first frame interval, a first frame comprises a first preamble section including a first preamble, a first MAP section including data burst allocation information for the first RS and data burst allocation information for an MS connected directly to the BS, a first data burst section including a data burst to be transmitted from the BS to the first RS, and a second data burst section including a data burst to be transmitted from the BS to the MS or a data burst received from the MS to the BS, and
   in the second frame interval, a second frame comprises a second preamble section including a second preamble, a second MAP section including data burst allocation information for the second RS and data burst allocation information for the MS, a third data burst section including a data burst to be transmitted from the BS to the second RS, and a fourth data burst section including a data burst to be transmitted from the BS to the MS or a data burst received from the MS to the BS.

3. The method as claimed in claim 2, further comprising one of:
   transmitting, by the first RS, a data burst to the first MS, or receiving a data burst from the first MS by using the second data burst section excluding a predetermined transmit/receive transition gap (TTG).

4. The method as claimed in claim 3, further comprising transmitting, by the first RS, a third frame to the first MS and the third RS in the second frame interval, and
wherein the third frame comprises a first preamble section including the first preamble, a third MAP section including data burst allocation information for the third RS and data burst allocation information for the first MS, a fifth data burst section including a data burst to be transmitted from the first RS to the third RS, and a sixth data burst section including a data burst to be transmitted from the first RS to the first MS or a data burst received from the first MS to the first RS.

5. The method as claimed in claim 4, further comprising transmitting, by the third RS, a fifth frame to at least one of a fifth RS belonging to the first RS group and a third MS connected directly to the third RS, in the first frame interval, and
wherein the fifth frame comprises a first preamble section including the first preamble, a fifth MAP section including data burst allocation information for the fifth RS and data burst allocation information for the third MS, a ninth data burst section including a data burst to be transmitted from the third RS to the fifth RS, and a tenth data burst section including a data burst to be transmitted from the third RS to the third MS or a data burst received from the third MS to the third RS.

6. The method as claimed in claim 5, further comprising one of: transmitting, by the third RS, a data burst to the third MS, or receiving a data burst from the third MS by using the sixth data burst section of the third frame excluding a predetermined TTG.

7. The method as claimed in claim 6, further comprising one of: transmitting, by the fifth RS, a data burst to at least one fifth MS connected directly to the fifth RS, or receiving a data burst from the fifth MS by using the tenth data burst section of the fifth frame excluding a predetermined TTG.

8. The method as claimed in claim 2, further comprising transmitting, by the second RS, a fourth frame to the fourth RS and the second MS in the first frame interval, and
wherein the fourth frame comprises a second preamble section including the second preamble, a fourth MAP section including data burst allocation information for the fourth RS and data burst allocation information for the second MS, a seventh data burst section including a data burst to be transmitted from the second RS to the fourth RS, and an eighth data burst section including a data burst to be transmitted from the second RS to the second MS or a data burst received from the second MS to the second RS.

9. The method as claimed in claim 8, further comprising one of: transmitting, by the second RS, a data burst to the second MS, or receiving a data burst from the second MS by using the fourth data burst section of the second frame excluding a predetermined TTG.

10. The method as claimed in claim 9, further comprising transmitting, by the fourth RS, a data burst to a fourth MS connected directly to the fourth RS, or receiving a data burst from the fourth MS by using the eighth data burst section of the fourth frame excluding a predetermined TTG.

11. The method as claimed in claim 10, further comprising transmitting, by the fourth RS, a sixth frame to at least one of the fourth MS and a sixth RS belonging to the second RS group, in the second frame interval, and
wherein the sixth frame comprises a first preamble section including the first preamble, a sixth MAP section including data burst allocation information for the sixth RS and data burst allocation information for the fourth MS, an eleventh data burst section including a data burst to be transmitted from the fourth RS to the sixth RS, and a twelfth data burst section including a data burst to be transmitted from the fourth RS to the fourth MS or a data burst received from the fourth MS to the fourth RS.

12. The method as claimed in claim 11, further comprising one of: transmitting, by the sixth RS, a data burst to at least a sixth MS connected directly to the sixth RS, or receiving a data burst from the sixth MS by using the twelfth data burst section of the sixth frame excluding a predetermined TTG.

13. A system for transmitting/receiving a signal in a communication system, the system comprising:
a first Relay Station(RS) configured to receive data from a Base Station (BS) through a first frame interval, the first RS that is connected directly to the BS from among RSs belonging to a first RS group; and
a second RS configured to receive data from the BS through a second frame interval subsequent to the first frame interval, the second RS that is connected directly to the BS from among RSs belonging to a second RS group,
wherein a data is transmitted and received between the BS and the first RS belonging to the first RS group, between the second RS and at least one of a fourth RS belonging to the second RS group, and between the second RS and a second Mobile Station (MS) connected directly to the second RS through the first frame interval, and
wherein a data is transmitted and received between the BS and the second RS belonging to the first RS group, between the first RS and at least one of a third RS belonging to the first RS group, and between the first RS and a first MS connected directly to the first RS through the second frame interval.

14. The system as claimed in claim 13, wherein, in the first frame interval, a first frame of the BS comprises a first preamble section including a first preamble, a first MAP section including data burst allocation information for the first RS and data burst allocation information for an MS connected directly to the BS, a first data burst section including a data burst to be transmitted from the BS to the first RS, and a second data burst section including a data burst to be transmitted from the BS to the MS or a data burst received from the MS to the BS, and
in the second frame interval, a second frame of the BS comprises a second preamble section including a second preamble, a second MAP section including data burst allocation information for the second RS and data burst allocation information for the MS, a third data burst section including a data burst to be transmitted from the BS to the second RS, and a fourth data burst section including a data burst to be transmitted from the BS to the MS or a data burst received from the MS to the BS.

15. The system as claimed in claim 14, wherein the first RS transmits a data burst to the first MS in direct communication with the first RS, or receives a data burst from the first MS by using the second data burst section excluding a predetermined transmit/receive transition gap (TTG).

16. The system as claimed in claim 15, wherein the first RS transmits a third frame to the first MS and the third RS, in the second frame interval; and
wherein the third frame comprises a first preamble section including the first preamble, a third MAP section including data burst allocation information for the third RS and data burst allocation information for the first MS, a fifth data burst section including a data burst to be transmitted from the first RS to the third RS, and a sixth data burst section including a data burst to be transmitted from the first RS to the first MS or a data burst received from the first MS to the first RS.

17. The system as claimed in claim 16, wherein the third RS transmits a fifth frame to at least one of a fifth RS belonging to the first RS group and a third MS connected directly to the third RS, in the first frame interval, and wherein the fifth frame comprises a first preamble section including the first preamble, a fifth MAP section including data burst allocation information for the fifth RS and data burst allocation information for the third MS, a ninth data burst section including a data burst to be transmitted from the third RS to the fifth RS, and a tenth data burst section including a data burst to be transmitted from the third RS to the third MS or a data burst received from the third MS to the third RS.

18. The system as claimed in claim 17, wherein the third RS transmits a data burst to the third MS, or receives a data burst from the third MS by using the sixth data burst section of the third frame excluding a predetermined TTG.

19. The system as claimed in claim 18, wherein the fifth RS transmits a data burst to at least one fifth MS connected directly to the fifth RS, or receives a data burst from the fifth MS by using the tenth data burst section of the fifth frame excluding a predetermined TTG.

20. The system as claimed in claim 14, wherein the second RS transmits a fourth frame to the fourth RS and the second MS, in the first frame interval, and wherein the fourth frame comprises a second preamble section including the second preamble, a fourth MAP section including data burst allocation information for the fourth RS and data burst allocation information for the second MS, a seventh data burst section including a data burst to be transmitted from the second RS to the fourth RS, and an eighth data burst section including a data burst to be transmitted from the second RS to the second MS or a data burst received from the second MS to the second RS.

21. The system as claimed in claim 20, wherein the second RS transmits a data burst to the second MS, or receives a data burst from the second MS by using the fourth data burst section of the second frame excluding a predetermined TTG.

22. The system as claimed in claim 21, wherein the fourth RS transmits a data burst to a fourth MS directly connected to the fourth RS, or receives a data burst from the fourth MS by using the eighth data burst section of the fourth frame excluding a predetermined TTG.

23. The system as claimed in claim 22, wherein the fourth RS transmits a sixth frame to at least one of the fourth MS and a sixth RS belonging to the second RS group, in the second frame interval, and wherein the sixth frame comprises a first preamble section including the first preamble, a sixth MAP section including data burst allocation information for the sixth RS and data burst allocation information for the fourth MS, an eleventh data burst section including a data burst to be transmitted from the fourth RS to the sixth RS, and a twelfth data burst section including a data burst to be transmitted from the fourth RS to the fourth MS or a data burst received from the fourth MS to the fourth RS.

24. The system as claimed in claim 23, wherein the sixth RS transmits a data burst to at least one sixth MS connected directly to the sixth RS, or receives a data burst from the sixth MS by using the twelfth data burst section of the sixth frame excluding a predetermined TTG.

* * * * *